June 11, 1940.  E. A. BURGESS  2,203,813

WATER MOTOR

Filed May 1, 1939

INVENTOR.
Ernest A. Burgess
BY Robt D Pearson
ATTORNEY.

Patented June 11, 1940

2,203,813

UNITED STATES PATENT OFFICE 2,203,813

WATER MOTOR

Ernest A. Burgess, Los Angeles, Calif.

Application May 1, 1939, Serial No. 271,078

1 Claim. (Cl. 253—140)

This invention relates to a water driven motor.

One object of the invention is to provide an exceedingly simple device which may be attached to an ordinary water service faucet in order to utilize the current of water coming therefrom to rotate a shaft by which may be driven various small appliances, for example, an emery wheel or small grindstone.

A more specific object of the invention is to provide a superior arrangement of water jets in relation to the water driven wheel whereby the water power is made to act more effectively upon said wheel.

Other objects, advantages and features of invention will hereinafter appear.

Referring to the accompanying drawing, which illustrates what is at present deemed to be a preferred embodiment of the invention, Fig. 1 is a longitudinal mid-section of the device.

Figure 1:
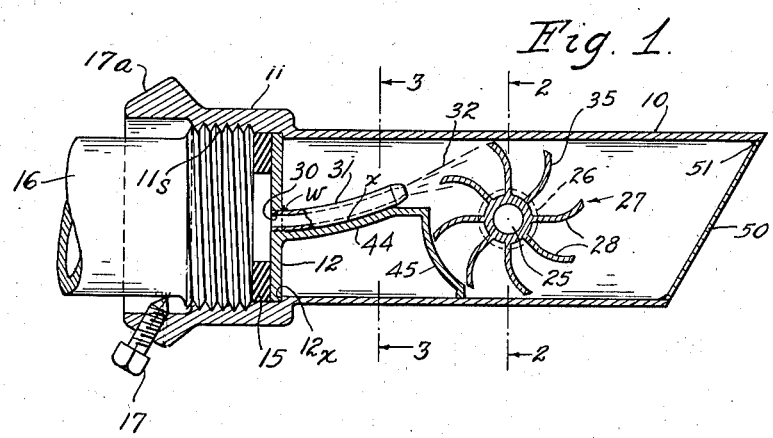
Figure 2:
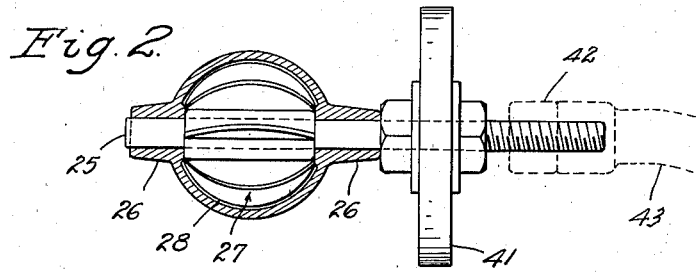
Fig. 2 is a cross-section on line 2—2 of Fig. 1.
Figure 3:
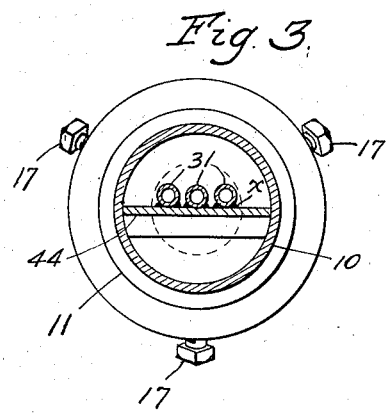
Fig. 3 is a cross-section on line 3—3 of Fig. 1.

Referring in detail to the drawing, the cylindrical conduit 10 has its intake end formed with a diametrically enlarged portion 11 having an internally threaded section 11s to screw on to the supply pipe 16. A circular partition plate 12 forms a nozzle base and divides the intake portion of tube 10 from the remainder thereof, said plate abutting the annular shoulder 12x. The side of said plate opposite to said shoulder is engaged by a gasket 15 which forms a water tight fit between the plate and pipe 16. A plurality of pointed set screws 17 are circumferentially grouped around the unthreaded outer part of the tube portion 11 for use in connecting the device onto unthreaded pipes, said screws being inclined in such a manner as to cause the end of the pipe to be urged against the gasket 15, and a thickened shouldered part 17a being provided for them.

By the construction which has been described the device is adapted for being connected up with the indoor type of non-threaded faucet, or onto exteriorly threaded out door faucets.

Diametrically across the tube 10 extends a rotatable shaft 25 having bearings 26 in the sides of said tube. To this shaft is secured, within said tube, a water wheel 27 having a plurality of radial vanes 28, a sufficient number of such vanes being shown in the drawing to utilize efficiently the force obtainable from the streams of water 32.

The nozzle 11 is shown provided with a plurality of adjacent parallel discharge or jet tubes 31 which, in the illustrated embodiment are positioned to direct three independent but adjacent streams 32 of water against the outer portion of each vane of the water wheel as it approaches that side of the tube 10 toward which the streams from the nozzle are directed. As viewed in Fig. 1 each blade or vane 28 has its outer portion 35 deflected in the anticlockwise direction, thus causing the streams from the nozzle to act upon that face of each passing vane occupied by the inner angle between the main part of the vane and its deflected portion. This construction provides for an efficient driving of the water wheel in the clockwise direction.

The water streams 32 are delivered as close to each other as possible without being intermingled. The same quantity of water per unit of time, delivered through other means has not been found so effective for driving miniature water wheels.

Each vane 28 is made of the proper length to come close to but safely clear the adjacent wall of the tube 10, and has its semicircular free edge portion curved to conform to the curvature of said wall.

The shaft 25 may be utilized to drive various appliances or small machines. In the drawing an emery wheel 41 is shown secured to said shaft, and to the outer end of the shaft is attached, by a coupler 42 a flexible shaft section 43 which may be driven by a small amount of power.

A guard member is provided, which consists of a plate 44 underlying the jet tubes 31 and extending from side to side of the tube 10, said member having a deflected end portion consisting of a semicircular plate 45 which prevents back flow of water from the water wheel 27. Said guard member is carried by and desirably formed integral with the partition plate 12. The jet tubes 31 fit within openings 31 provided for them in the disk 12 and are secured to said disk by welds w.

For the purpose of preventing water from splashing as it issues from the delivery end of the tube 10, a screen 50 is placed across the otherwise open discharge end of said tube. In order to afford less obstruction for the water this end of the tube is cut off on a bias so that a larger area of screen is provided for the water to pass through. The edge of the opening covered by the screen is inclined in such a manner as to dispose the acute angle 51 at that side of the tube toward which the streams of water are directed. This construction offers freeness of water delivery even though a short tube 10 is used.

The jet tubes 31 together with the plate 12, 44 and 45 constitute an assembly of parts which is readily insertable into the intake end of the device to a position wherein the peripheral portion of the plate 12 abuts against the shoulder 12x at the juncture of the body portion of the tube 10 with its diametrically enlarged part 11. The gasket 15 is next put into place and then the part 11 may be screwed on to the pipe 16 to the position shown in Fig. 1. Or, if it is necessary to connect to an unthreaded supply pipe or smooth faucet spout, the set screws 17 are utilized to urge the device into a water tight relation to the supply pipe.

The jet tubes 31 and plate 44 abut against each other along a curved plane and are secured together by elongated welds $x$ in a very secure manner. The curved character of said tubes enables the workman to bore the holes 31 at right angles to the disk 12, thus making it easier to form said holes.

What is claimed is:

In a device of the kind described, a cylindrical conduit, a rotatable shaft extending diametrically through said conduit and having a power delivery portion outside of said conduit, a water wheel secured to said shaft within said conduit, said water wheel having vanes the extremities of which are deflected in the same circumferential direction, a nozzle structure arranged to direct a plurality of adjacent parallel streams of water against said vanes as they pass through the space between said shaft and one side of said tube, said streams being inclined in relation to the axis of said conduit in a direction to cause them to strike upon that face of each passing vane occupied by the inner angle between the main part of the vane and its deflected portion, the discharge end of said cylindrical conduit being cut across on a bias the acute angle of which is located at that side of the conduit toward which the aforesaid streams of water are directed, and a screen secured over said discharge end of said conduit.

ERNEST A. BURGESS.